United States Patent [19]

Geissler et al.

[11] Patent Number: 5,679,735
[45] Date of Patent: Oct. 21, 1997

[54] PROCESS FOR THE PREPARATION OF SYNTHETIC RESIN DISPERSIONS

[75] Inventors: Ulrich Geissler, Hochheim; Helmut Rinno, Lorsbach; Heinz-Josef Thevissen, Niedernhausen, all of Germany

[73] Assignee: Hoechst Aktiengesellschaft, Frankfurt am Main, Germany

[21] Appl. No.: 577,551

[22] Filed: Dec. 22, 1995

[30] Foreign Application Priority Data

Dec. 24, 1994 [DE] Germany ............... 44 46 539.4

[51] Int. Cl.$^6$ .................. C08F 2/24; C08V 5/101; C08L 33/12; C08L 31/04
[52] U.S. Cl. .................. 524/459; 524/460; 524/733; 524/773; 526/81; 526/86; 526/87; 526/200; 526/201; 526/202; 526/203
[58] Field of Search .................. 524/459, 460, 524/733, 773; 526/81, 86, 87, 200, 201, 202, 203

[56] References Cited

U.S. PATENT DOCUMENTS

| | | | |
|---|---|---|---|
| 2,795,564 | 6/1957 | Conn et al. | 260/29.6 |
| 3,054,762 | 9/1962 | Rees | 524/733 |
| 3,423,352 | 1/1969 | Levine et al. | 526/81 |
| 3,442,844 | 5/1969 | Bouchard | 524/460 |
| 3,491,039 | 1/1970 | Takahashi et al. | 524/460 |
| 4,265,796 | 5/1981 | Mueller-Mall et al. | 526/81 |
| 4,397,968 | 8/1983 | Eck et al. | 523/305 |
| 4,659,771 | 4/1987 | Creig | 524/733 |
| 4,670,505 | 6/1987 | Craig | 524/704 |

FOREIGN PATENT DOCUMENTS

| | | |
|---|---|---|
| 2127919 | 3/1995 | Canada. |
| 0 226 527 | 6/1987 | European Pat. Off.. |
| 0 538 571 | 4/1993 | European Pat. Off.. |
| 1 278 813 | 6/1972 | United Kingdom. |
| 2 049 712 | 12/1980 | United Kingdom. |

OTHER PUBLICATIONS

Puterman et al., "Latex Preparation and Stabilization by Hydrophobically Modified Hydroxyethyl Celluloses", Journal of Applied Polymer Science, vol. 40, 333–343, (1990).
Chemical Abstracts, vol. 112, No. 4, "Emulsion Polymerization and Copolymerization of Vinyl and Acrylate Monomers", Abstract No. 21424, (1990).

Primary Examiner—Peter A. Szekely
Attorney, Agent, or Firm—Foley & Lardner

[57] ABSTRACT

A process for the preparation of a synthetic resin dispersion stabilized by a protective colloid employing at least one initiator and based on a polymer of (a) a first monomer of at least one ester of acrylic acid or methacrylic acid and an alcohol containing 1 to 22 carbon atoms; and optionally, (b) a second monomer which can be copolymerized with the first monomers. The process comprises introducing at least 50% of the monomers based on the total weight of the monomers, at least 50% of the protective colloid based on the total weight of the protective colloid, and up to 50% of the initiator based on the total weight of the initiator into a reaction vessel to form an aqueous emulsion. Any remaining monomers and protective colloid and at least 50% of the initiator based on the total weight of the initiator are then added to the reaction vessel at a temperature of 30° to 100° C.

24 Claims, 1 Drawing Sheet

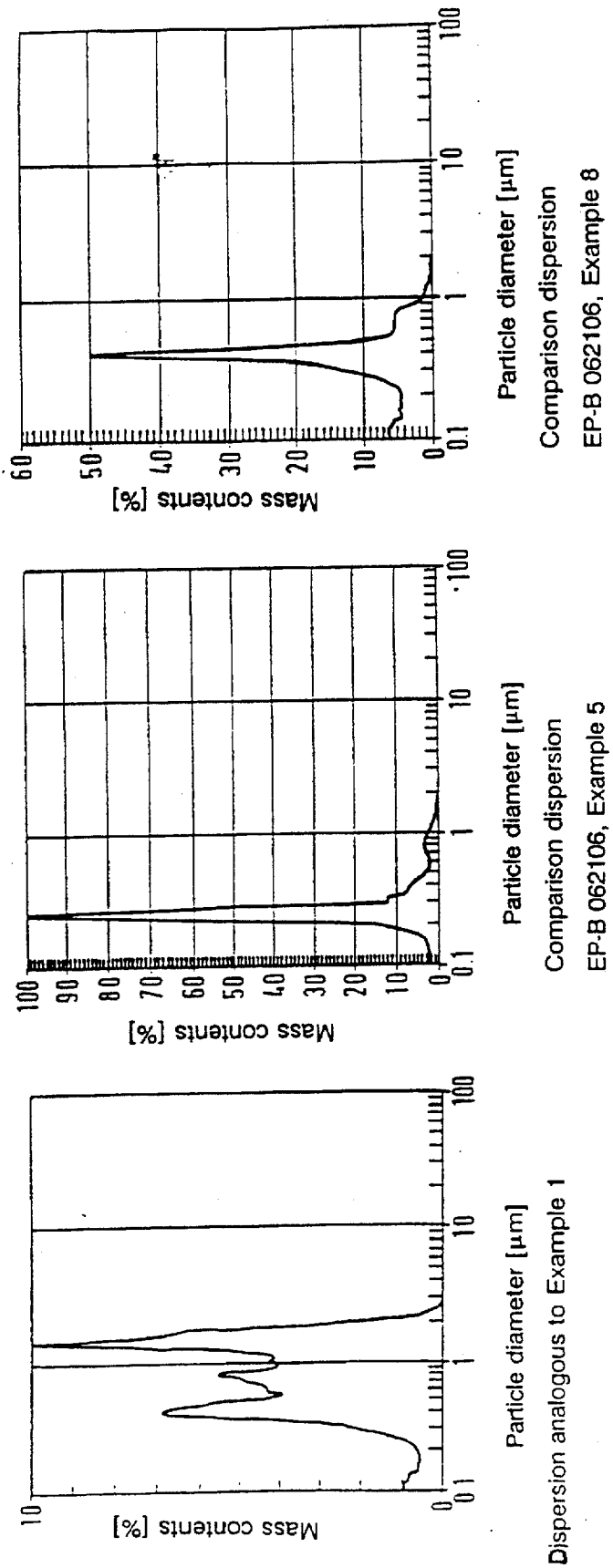

PROCESS FOR THE PREPARATION OF SYNTHETIC RESIN DISPERSIONS

BACKGROUND OF THE INVENTION

1. Field of the Invention

The present invention relates to the preparation and use of aqueous styrene/(meth)acrylate dispersions stabilized by protective colloids.

2. Description of Related Art

Processes for the preparation of emulsifier-stabilized (meth)acrylate and styrene/(meth)acrylate dispersions are known (EP-A 0 226 527, U.S. Pat. No. 2,795,564). Processes for the preparation of aqueous synthetic resin dispersions stabilized by protective colloids are likewise known (J. Appl. Poly. Sci., Volume 40, 333–343 (1990)). However, there are difficulties in the preparation of (meth)acrylate and styrene/(meth)acrylate dispersions stabilized by protective colloids, as known processes display an extreme rise in viscosity during polymerization of (meth)acrylates in the presence of protective colloids (U.S. Pat. No. 4,670,505).

U.S. Pat. No. 4,670,505 describes a process for the preparation of (meth)acrylate synthetic resin dispersions in which up to 5% by weight, based on the monomers, of a water-soluble amino alcohol compound is employed in addition to the protective colloid. The amino alcohol compound acts as an agent which traps free radicals during grafting of the monomers onto the protective colloid, and thus acts as a viscosity regulator.

In GB-A 1 278 813, the viscosity problem is solved by addition of up to 10% by weight, based on the monomers, of a stabilizing compound, such as allyl alcohol or saturated aliphatic alcohols.

EP-B 0 062 106 relates to a process for the preparation of finely divided (meth)acrylate and styrene/(meth)acrylate dispersions stabilized by polyvinyl alcohol, which comprises metering the addition of most of the monomers in the form of a pre-emulsion during the reaction.

EP-B 0 538 571 describes a process for the preparation of emulsifier-free aqueous synthetic resin dispersions based on more than 50% by weight of styrene and/or alkyl (meth) acrylate and stabilized by protective colloids, the polymerization being carried out by a monomer feed procedure and the total amount of the protective colloid being added to the initial mixture of monomers. In addition, acrylamide is employed in all the examples. However, acrylamide has proved to be carcinogenic in animal studies (maximum workplace concentration list A2 K, threshold limit value list A2) and as far as possible should no longer be used for preparation of dispersions.

SUMMARY OF THE INVENTION

An object of the invention therefore is to provide a process for the preparation of aqueous synthetic resin dispersions which are stabilized by protective colloids.

In accordance with this object there is provided a process for the preparation of a synthetic resin dispersion stabilized by a protective colloid whereby the synthetic resin dispersion employs at least one polymerization initiator and is based on a polymer of (a) a first monomer of at least one ester of acrylic acid or methacrylic acid and an alcohol containing 1 to 22 carbon atoms; and optionally, (b) a second monomer which can be copolymerized with the first monomer. The process comprises introducing at least 50% of the monomers based on the total weight of the monomers, at least 50% of the protective colloid based on the total weight of the protective colloid, and up to 50% of the initiator based on the total weight of the initiator into a reaction vessel to form an aqueous emulsion. Any remaining monomers and protective colloid and at least 50% of the initiator based on the total weight of the initiator are then added to the reaction vessel at a temperature of 30° to 100° C.

It is another object of the invention to provide aqueous synthetic resin dispersions which are prepared by the above-described process.

It is still a further object of the invention to provide methods for the use of the aqueous synthetic resin dispersions prepared according to the invention and products resulting therefrom.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 1a depicts a particle size distribution from aerosol spectroscopy of a dispersion analogous to Example 1 according to the present invention.

FIG. 1b depicts a particle size distribution from aerosol spectroscopy of a comparative dispersion according to EP-B-062106.

FIG. 1c depicts a particle size distribution from aerosol spectroscopy of a comparative dispersion according to EP-B-062106.

DETAILED DESCRIPTION OF THE PREFERRED EMBODIMENTS

The process of the present invention is easy to carry out industrially for the preparation of aqueous synthetic resin dispersions stabilized by protective colloids, in which the viscosity of the dispersions during the polymerization process lie in a range which guarantees good stirrability and pumpability.

The polymers in the aqueous synthetic resin dispersions stabilized by a protective colloid can have a minimum film formation temperature (MFT) of up to 60° C., in particular of 0° C. to 40° C. At an MFT of the polymers below 0° C., the glass transition temperatures of these polymers are preferably at least −50° C., more preferably between −50° C. and 0° C., in particular between −30° C. and 0° C.

The MFT is established by a suitable combination of "plasticizing" monomers (acrylic acid esters or higher methacrylic acid esters) and "hardening" monomers (methacrylic acid esters and styrene).

Esters of acrylic acid or methacrylic acid with an alcohol containing 1 to 12 carbon atoms are preferably employed as the monomers of group a). Examples of monomers of group a) are methyl acrylate, ethyl acrylate, n-propyl acrylate, n-butyl acrylate, i-butyl acrylate, t-butyl acrylate, n-hexyl acrylate, n-octyl acrylate, 2-ethylhexyl acrylate, lauryl acrylate, stearyl acrylate, methyl methacrylate, ethyl methacrylate, n-propyl methacrylate, n-butyl methacrylate, i-butyl methacrylate, n-octyl methacrylate, 2-ethylhexyl methacrylate, decyl methacrylate, i-decyl methacrylate, lauryl methacrylate, stearyl methacrylate and, behenyl methacrylate. Possible monomers of group b) are, inter alia, preferably vinyl aromatics, in particular styrene, and vinyl esters, in particular vinyl esters of linear or branched monocarboxylic acids having 2 to 12 carbon atoms. Examples of suitable vinyl esters are vinyl acetate, vinyl propionate, vinyl butyrate, vinyl isobutyrate, vinyl pivalate, vinyl 2-ethylhexanoate and vinyl esters of ®Versatic acid 9, 10 or 11 ($\alpha,\alpha$-dialkyl-branched monocarboxylic acids, Shell Chemie). The choice of monomers is to be made such that adequate copolymerizability is ensured.

The content of styrene and (meth)acrylate monomers together or of (meth)acrylate monomers in the case of styrene-free systems is preferably more than 50% by weight, in particular more than 70% by weight, based on the total monomer content.

Compounds with acetoacetoxy groups, such as, for example, acetoacetoxyethyl methacrylate or $\omega$-acrylamido-$\omega$,$\omega$-dimethylalkanesulfonic acids, for example 2-acrylamido-2,2-dimethylethanesulfonic acid, or an alkali metal salt or ammonium salt thereof, can furthermore be copolymerized.

It is furthermore possible to employ monoolefinically unsaturated monocarboxylic acids and dicarboxylic acids, for example, acrylic acid, methacrylic acid, maleic acid, fumaric acid and itaconic acid, as well as mono- and diesters of dicarboxylic acids, for example maleic acid monomethyl ester and maleic acid 2-ethylhexyl ester.

Suitable copolymer compositions consist of, for example, methyl methacrylate/butyl acrylate/methacrylic acid (25:74:1), methyl methacrylate/butyl acrylate/acetoacetoxyethyl methacrylate (34:64:2), methyl methacrylate/2-ethylhexyl acrylate/methacrylic acid (59:39:2), methyl methacrylate/butyl acrylate/lauryl methacrylate/methacrylic acid (35:58:5:2) or styrene/butyl acrylate/acrylic acid (34:64:2).

Protective colloids which are preferably employed are etherified cellulose derivatives, for example, hydroxyethylcellulose, methylcellulose, carboxymethylcellulose, polyvinylpyrrolidone, polycarboxylic acids and, in particular, polyvinyl alcohol. Mixtures of different protective colloids may also be employed.

Polyvinyl alcohol is preferably employed in amounts of 4 to 15% by weight, in particular 5 to 10% by weight, based on the monomers. The degree of polymerization of the polyvinyl alcohol is preferably 200 to 3,500, in particular 500 to 3,000. A mixture of polyvinyl alcohols having different average molecular weight is particularly preferred. The degree of hydrolysis of the polyvinyl alcohol is preferably 80 to 98 mol %, in particular 88 mol %.

In the process according to the invention, preferably at least 80% by weight, in particular at least 90% by weight, of the total amount of monomers and protective colloid is initially introduced into the reaction vessel, and preferably at least 80% by weight, in particular at least 90% by weight, of the initiator is added at a reaction temperature of 40° to 90° C.

According to another embodiment, the total amount of monomers and protective colloid is initially introduced into the reactor vessel and the total amount of the initiator is metered in at a reaction temperature of from 30° to 100° C., preferably 40° to 90° C., and most preferably 80° to 90° C.

According to another embodiment, the total amount of monomers and protective colloid is initially introduced into the reaction vessel together with 5 to 20% by weight, preferably 5 to 10% by weight, of the total amount of initiator, the polymerization is started at a temperature of 50° C. to 60° C., and the remaining amount of initiator is then metered in at a temperature of 80° to 90° C. such that a temperature of 80° C. to 90° C. is maintained until the end of the polymerization.

One or more water-soluble or essentially water-insoluble polymerization initiators can be employed. Examples of water-soluble initiators are sodium peroxodisulfate, potassium peroxodisulfate and ammonium peroxodisulfate and water-soluble azo initiators, such as, for example, 2,2'-azobis(2-amidino propane) dihydrochloride. Suitable monomer-soluble initiators are organic hydroperoxides, for example, tert-butyl hydroperoxide and cumene hydroperoxide, organic peroxides, for example dibenzoyl peroxide and dilauryl peroxide, and monomer-soluble azo compounds, such as azobisisobutyronitrile.

The initiators can preferably also be employed in combination with substances having a reducing action, such as, for example, sodium bisulfite, sodium hydroxymethanesulfinate, and the like.

The initiators are preferably employed in an amount of in each case 0.05 to 1.0% by weight, based on the total amount of monomers.

In addition, nonionic or ionic emulsifiers, and if appropriate combinations of both types, regulators and defoamers can also be added.

Nonionic emulsifiers which are used are, for example, alkyl polyglycol ethers, such as the ethoxylation products of lauryl, oleyl, stearyl or coconut fatty alcohol, alkylphenol polyglycol ethers, such as the ethoxylation products of octyl- or nonyl-phenol diisopropyl-phenol, triisopropylphenol or of di- or tri-tertbutyl-phenol; or ethoxylation products of propylene oxide.

Possible ionic emulsifiers are primarily anionic emulsifiers. These can be the alkali metal or ammonium salts of alkyl-, aryl- or alkylarylsulfonic acids, as well as the corresponding sulfates, phosphates or phosphonates, it also being possible for oligo- or polyethyleneoxide units to be present between the hydrocarbon radical and the anionic group. Typical examples are sodium lauryl sulfate, sodium octylphenol glycol ether sulfate, sodium dodecyl benzene sulfonate, sodium lauryl diglycol sulfate, and ammonium tri-tert-butylphenol pentaglycol sulfate or octaglycol sulfate.

The emulsifiers can be employed in an amount of 0.1 to 5% by weight, based on the total amount of monomers.

The pH of the reaction mixtures should be between 4 and 7, preferably between 3 and 6. It may be adjusted, for example, with sodium bicarbonate.

The heat of reaction formed during the polymerization can be removed by indirect cooling of the reaction mixture via the tank wall or via internal or external heat exchangers, and also via evaporative cooling. In the case of evaporative cooling, a water/monomer mixture is distilled off, if appropriate under reduced pressure, condensed and recycled to the reaction batch.

The dispersions according to the invention preferably have solids contents of 30 to 70% by weight, in particular 40 to 60% by weight.

The viscosity of approximately 50% strength dispersions is preferably 500 to 3,000 mPa.s, in particular 500 to 2,000 mPa.s (shear rate D=386.6 s$^{-1}$). The average particle diameters $d_w$ of such dispersions are preferably in the range from 500 to 2,500 nm, in particular from 1,000 to 2,000 nm, where $d_w/d_n$ is between 3 and 20, in particular between 4 and 15.

Compared with metering processes such as metering of a monoemulsion (EP-B 0 062 106) or metering of monomers (EP-B 0 538 571), the batch process according to the invention leads to higher molecular weights, which is reflected in a higher elasticity and non-tackiness of the dispersion films. The dispersion films are furthermore very stable towards hydrolysis.

The present invention also relates to the use of the dispersions stabilized by protective colloids. The dispersions prepared according to the invention are preferably used as binders in environment-friendly wood preservative paints.

Synthetic resin powders which are very readily redispersible can be prepared from the dispersions prepared according to the invention by spray drying. The particle size achieved allows easy spraying of the dispersions. Such synthetic resin powders can be employed in hydraulically setting building materials and in powder coatings.

The following examples serve to illustrate the invention in more detail. The parts and percentages mentioned relate to the weight, unless noted otherwise.

EXAMPLE 1

881 parts of complete desalinated water were initially introduced into a reaction vessel which was in a heating bath and was equipped with a stirrer, reflux condenser, dropping funnel, thermometer and nitrogen inlet.

49.0 parts of polyvinylalcohol (viscosity of a 4% strength aqueous solution at 20° C.: 8 mPa.s, degree of hydrolysis: 88 mol %, degree of polymerization: 1,400), 39.2 parts of polyvinyl alcohol (viscosity of a 4% strength aqueous solution at 20° C.: 18 mPa.s, degree of hydrolysis: 88 mol %, degree of polymerization: 2,700), 1.76 parts of sodium bicarbonate, 3.5 parts of ($C_{12}/C_{14}$)-alcohol ether sulfate sodium salt (28% strength) (®Genapol ZRO, Hoechst) and 0.98 part of a defoamer based on a combination of liquid hydrocarbons, hydrophobic silicic acid, synthetic copolymers and nonionic emulsifiers (®Agitan 281, M ünzing Chemie)

were added, while stirring.

The mixture was heated to 80° C., while passing in nitrogen, and stirred at this temperature for 3 hours.

It was then cooled again and 637 parts of n-butyl acrylate, 343 parts of methyl methacrylate, 19.6 parts of acetoacetoxyethyl methacrylate, 19.6 parts of methacrylic acid and 0.92 parts of n-dodecanethiol were added.

The mixture was heated again to 80° C. and the following initiator solutions were metered in over a period of 3 hours in parallel:

2.06 parts of t-butyl hydroperoxide (70% strength) (®Trigonox A-W70, Akzo-Chemie) in 88 parts of completely desalinated water, 1.44 parts of sodium hydroxymethanesulfinate (®Rongalit C, BASF) in 88 parts of completely desalinated water.

During this period, the internal temperature of 80° C. was maintained, which was achieved by cooling in the starting phase and heating in the subsequent phase. After the end of metering, the mixture was allowed to after-react at 80° C. for a further hour and was then cooled to room temperature.

A flawless, virtually speck-free dispersion is obtained.

| Physical data of the dispersion: | |
|---|---|
| Solids content: | 50.6% |
| Residual monomer content: | <0.01% of methyl methacrylate |
| | 0.01% of butyl acrylate |
| Viscosity (386.6 s$^{-1}$): | 1,790 mPa.s |
| Average particle diameter $d_w$: | 1,155 nm |
| Particle size distribution $d_w/d_n$: (Aerosol spectroscopy) | 4.69 |

As a comparison, Examples 6, 9, 11 and 19 from EP-B 0 538 571 were reworked. In the first two cases, dispersions with specks were obtained, the dispersion according to Example 11 was dilatant, and a usable dispersion can be obtained only analogously to Example 19. However, this is necessarily linked with the use of toxic acrylamide. A reduction in the acrylamide content or replacement of acrylamide by methacrylic acid or acrylic acid led to unusable dispersions.

In each case 2.5%, based on the solids, of polyvinyl alcohol (viscosity of a 4% strength aqueous solution at 20° C.: 4 mPa.s, degree of hydrolysis: 88 mol %, degree of polymerization: 630) was added as a 25% strength solution to the dispersions.

The dispersions were diluted to a solids content of 40% with deionized water and spray dried (spray dryer from Niro, entry temperature: 130° C., exit temperature: 65° C., throughput: 1 kg/hour) with the addition of an anticaking agent (aggregate of white talc with dolomite). The anticaking agent content was 12%.

The storage facility, redispersing properties and cement compatibility of the dispersion powder were determined.

1. Storage stability

The powder was introduced into a cylinder of 3 cm diameter and 4 cm height and stored at 50° C. under a weight of 1,400 g for 24 hours. After cooling, the caking of the powder was evaluated (1=caked little, easy to comminute, 6=caked severely, non-comminutable).

2. Redispersibility (tube sedimentation properties)

25 parts of dispersion powder were stirred into 25 parts of deionized water with a glass rod and the mixture was then homogenized at 2,000 rpm for 10 minutes. 2 parts of this redispersion were diluted with 198 parts of deionized water so that a 0.5% strength redispersion was formed. This was introduced into a vertically positioned tube of 165 cm height and 8 mm diameter, which was connected via a ground glass joint to an end piece of 10 cm length and 4 mm diameter. After 1, 2, 6, 24 and 48 hours, the amount of dispersion powder which had sedimented was measured in mm of height. A low tendency to sediment was a measure of good redispersibility.

3. Cement compatibility 500 parts of Portland cement PZ 35 were mixed with 1500 parts of standard sand and 50 parts of dispersion powder in the dry state and were then mixed with 250 parts of water. Immediately after the cement mortar containing the dispersion powder had been prepared and 15 minutes after its preparation, its slump was determined in accordance with DIN 18 555 part 2. The cement compatibility of the dispersion powder was better, the higher the slump of the cement mortar and the more slowly this decreased as a function of time.

The results can be seen from the following table:

TABLE 1

| | Use testing | |
|---|---|---|
| | Example 1 | Comparison Example 19 from EP-B 0 538 571 |
| Storage stability | 2 | 5 |
| Tube sedimentation properties (mm) 1/2/6/24/48 hours | 0/1/2/7/8 | 3/8/19/34/39 |
| Slump (immediate/15 minutes) | 16.5/15.6 | 13/11.5 |

As can be seen from the table, the dispersion powder according to the invention showed significant advantages in respect of storage stability, redispersibility and cement compatibility.

Dispersions were additionally prepared analogously to Examples 5 and 8 from EP-B 0 062 106.

The following Table 2 shows a summary of the average particle diameters and the particle size distributions of these dispersions compared with the dispersion from Example 1 according to the invention:

TABLE 2

| | Particle size | | |
|---|---|---|---|
| | Example 1 | Comparison Example 5 from EP-B 0 062 106 | Comparison Example 8 from EP-B 0 062 106 |
| Average particle diameter $d_w$ (nm) | 1155 | 364 | 475 |
| Particle size distribution $d_w/d_n$ | 4.69 | 1.65 | 2.51 |

The different particle size distributions are additionally shown in the form of a graph in FIGS. 1a, 1b and 2c.

The average particle diameter of the dispersion according to the invention was considerably higher and the particle size distribution was significantly wider.

Spraying the comparison dispersion analogous to Example 5 from EP-B 0 062 106 gave a coarse powder which formed lumps even during storage at room temperature and was very poorly redispersible in water.

TABLE 3

| | Use testing |
|---|---|
| | Comparison Example 5 EP-B 0 062 106 |
| Storage stability | 5 |
| Tube sedimentation properties (mm) 1/2/6/24/48 hours | 6/10/21/38/40 |

The significantly better storage stability of the powder according to the invention was all the more surprising, since the polymer from Example 1 (monomer composition methyl methacrylate/butyl acrylate (35:65)) comprised a higher content of plasticizing monomers than the polymer analogous to Comparison Example 5 from EP-B 0 062 106 (monomer composition styrene/butyl acrylate (40:60)).

The comparison dispersion analogous to Example 8 led to a very tacky product which settled in the spray tower and in the pipelines.

EXAMPLE 2

A dispersion was prepared analogously to Example 1 using the following raw materials:

881 parts of completely desalinated water, 36.5 parts of polyvinyl alcohol (viscosity of a 4% strength aqueous solution at 20° C.: 4 mPa.s, degree of hydrolysis: 88 mol %, degree of polymerization: 630), 30.0 parts of polyvinyl alcohol (viscosity of a 4% strength aqueous solution at 20° C.: 18 mPa.s, degree of hydrolysis: 88 mol %, degree of polymerization: 2,700), 1.76 parts of sodium bicarbonate, 3.5 parts of $(C_{12}/_{14})$-alcohol ether sulfate sodium salt (28% strength) (Genapol ZRO) and 0.98 part of a defoamer based on a combination of liquid hydrocarbons, hydrophobic silicic acid, synthetic copolymers and nonionic emulsifiers (Agitan 281), 637 parts of n-butyl acrylate, 49 parts of methyl methacrylate, 294 parts of styrene 19.6 parts of acetoacetoxyethyl methacrylate, 19.6 parts of methacrylic acid and 0.92 parts of n-dodecanethiol.

Initiator solutions:

2.80 parts of t-butyl hydroperoxide (70% strength) (Trigonox A-W70) in 88 parts of completely desalinated water and 1.96 parts of sodium hydroxymethanesulfinate (Rongalit C) in 88 parts of completely desalinated water.

| Physical data of the dispersion: | |
|---|---|
| Solids content: | 49.1% |
| Viscosity (386.6 s$^{-1}$): | 2,890 mPa.s |
| Average particle diameter $d_w$: | 1,646 nm |
| Particle size distribution $d_w/d_n$: | 15.76 |
| (Aerosol spectroscopy) | |
| Use test results analogous to Example 1: | |
| Storage stability | 2- |
| Tube sedimentation properties (mm) 1/2/6/24/48 hours | 0/1/4/8/11 |
| Slump (immediate/15 minutes) | 17.1/14.6 |

EXAMPLE 3

A dispersion was prepared analogously to Example 1, the composition being varied as follows (monomer composition: n-butyl acrylate:methyl methacrylate (75:25):

429 parts of completely desalinated water, 16.8 parts of polyvinyl alcohol (viscosity of a 4% strength aqueous solution at 20° C.: 4 mPa.s, degree of hydrolysis: 88 mol %, degree of polymerization: 630), 13.9 parts of polyvinyl alcohol (viscosity of a 4% strength aqueous solution at 20° C.: 18 mPa.s, degree of hydrolysis: 88 mol %, degree of polymerization: 2,700), 0.82 parts of sodium bicarbonate, 6.93 parts an ethoxylated $C_{11}$-oxo alcohol (20% strength) (Genapol UD 110), 340 parts of n-butyl acrylate, 113 parts of methyl methacrylate, 9 parts of acetoacetoxyethyl methacrylate, 9 parts of methacrylic acid and 0.45 parts of n-dodecanethiol and 0.26 parts of t-butyl hydroperoxide (70% strength) (Trigonox A-W70) in 20 parts of completely desalinated water and 0.18 parts of sodium hydroxymethanesulfinate (Rongalit C) in 20 parts of completely desalinated water.

| Physical data of the dispersion: | |
| --- | --- |
| Solids content: | 50.7% |
| Residual monomer content: | <0.01% of methyl methacrylate |
| | 0.20% of butyl acrylate |
| Viscosity (386.6 s$^{-1}$): | 1,050 mPa.s |
| Average particle diameter $d_w$: | 640 nm |
| Particle size distribution $d_w/d_n$: (Aerosol spectroscopy) | 3.24 |

A white emulsion paint for painting wood was prepared in accordance with the following recipe:

126 parts of water, 75 parts of a 2% strength aqueous solution of methyl hydroxyethyl cellulose (®Tylose MH 4000 K, Hoechst), 10 parts of a 10% strength solution of a polyphosphate (®Calgon N, BK Ladenburg), 3 parts of a 90% strength aqueous solution of 2-amino-2-methyl-1-propanol (AMP 90), 5 parts of an ethyloxylated $C_{11}$-oxo alcohol (Genapol UD 088), 5 parts of a defoamer based on liquid hydrocarbons, hydrophobic silicic acid, fatty substances, oxyalkylated compounds and nonionic emulsifiers (Agitan 295), 2 parts of an isothiazolinone as a preservative (Mergal K9 N)

200 parts of titanium dioxide (®Kronos 2065, Kronos Titan), 20 parts of calcium carbonate (®Omya Calcidar 2, Omya), 20 parts of laminar magnesium silicate (®Micro Talk at 1, Norwegian Talc), 4 parts of polyurethane thickener (®Tafigel PUR 40, M ünzing Chemie) in 20 parts of water, 480 parts of the dispersion described above.

For comparison, the following emulsifier-stabilized pure acrylate dispersions prepared by means of the emulsion feed process were tested in the wood paint recipe described above:

| Comparison Example | Monomer composition n-butyl acrylate/methyl methacrylate (BuA/MMA) |
| --- | --- |
| A | 49:51 |
| B | 60:40 |
| C | 75:25 |

The tack and elongation at break of the paint films were determined in each case.

1. Tack test

The paint to be investigated was drawn onto a 90×180 mm glass plate with a box doctor knife (gap height=200 μm) and the plate was stored in a climatically controlled room (23° C., 50% relative atmospheric humidity) for 24 hours.

The sample plate was placed with the coated side on the measurement bench of a ®Polyken Tack Tester and loaded with a weight (1 kg).

The measurement was started, and the test plunger moved from the bottom against the surface and, after a holding time of 10 seconds, was pulled off at a speed of 10 mm/sec. The force required for this was indicated on a display instrument.

2. Elongation at break

Films about 130 μm thick were produced. The elongation at break was determined by means of a test machine from Zwick in accordance with DIN 53455 (test area 15 mm×50 mm), a traction rate of 200 mm/minute being established.

The following conditionings were chosen:

I Tack after drying at room temperature for 24 hours

II Elongation at break at room temperature

III Elongation at break at 0° C.

IV Elongation at break at −10° C.

V Elongation at break after storage in water for 24 hours, measured in the wet state at room temperature VI Elongation at break at room temperature after 3 cycles (24 hours storage in water/24 hours drying at 50° C.)

The results are summarized in Tables 4 and 5 below:

TABLE 4

| | Tack test | |
| --- | --- | --- |
| Dispersion No. | Monomers BuA/MMA | Tack (g) I |
| Example 3 | 75:25 | 323 |
| Comparison Example B | 60:40 | 900 |
| Comparison Example C | 75:25 | >2000 |

The tack of the paint film according to the invention was in an acceptable range. The tack of comparison paint film B was significantly higher, in spite of considerably more favorable conditions because of the lower content of n-butyl acrylate (BuA/MMA 60:40, compared with 75:25). The comparison paint film C with the same monomer ratio as Example 3 (BuA/MMA 75:25) was extremely tacky.

TABLE 5

| | | Elongation at break | | | | |
| --- | --- | --- | --- | --- | --- | --- |
| | Monomers | Elongation at break (%) | | | | |
| Dispersion No. | BuA/MMA | II | III | IV | V | VI |
| Example 3 | 75:25 | 303 | 166 | 62 | 485 | 247 |
| Comparison | 49:51 | 100 | 9 | 11 | 51 | 33 |

TABLE 5-continued

| | | Elongation at break | | | | |
|---|---|---|---|---|---|---|
| | Monomers | Elongation at break (%) | | | | |
| Dispersion No. | BuA/MMA | II | III | IV | V | VI |
| Example A Comparison Example B | 60:40 | 305 | 30 | 39 | 423 | 115 |

The table shows a significantly lower elongation at break of comparison film A, especially at low temperatures and after storage in water.

Comparison film B also shows a significant decrease in the elongation at break at low temperatures and after several periods of storage in water.

The product according to the invention is thus considerably more suitable for the preparation of elastic wood paints than comparison Examples A, B and C, since it has both a lower tackiness and good elongation at break (bridging of cracks) in the fresh state (no exposure to water) and after the action of water (simulation of exposure to rain).

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A process for preparing a synthetic resin dispersion stabilized by a protective colloid and employing at least one initiator and based on a polymer of (a) a first monomer comprising at least one ester of acrylic acid or methacrylic acid and an alcohol containing 1 to 22 carbon atoms; and optionally (b) a second monomer which can be copolymerized with said first monomer, said process comprising:

introducing at least 50% of the first monomer, and optionally, the second monomer based on the total weight of the monomers, at least 50% of the protective colloid based on the total weight of the protective colloid, and up to 50% of the initiator based on the total weight of the initiator into a reaction vessel to form an aqueous emulsion;

adding any remaining monomers and protective colloid, and at least 50% of the initiator based on the total weight of the initiator to the reaction vessel at a temperature of 30° to 100° C.

2. The process as claimed in claim 1, wherein the protective colloid comprises polyvinyl alcohol, the total amount of polyvinyl alcohol being 4 to 15% by weight, based on the total weight of the monomers.

3. The process as claimed in claim 1, wherein at least 80% by weight of the total amount of monomers and protective colloid are initially introduced into the reaction vessel and at least 80% by weight of the initiator is added at a reaction temperature of 40° to 90° C.

4. The process as claimed in claim 1, wherein the total amount of monomers and protective colloid are initially introduced into the reaction vessel and the total amount of initiator is added at a reaction temperature of 40° to 90° C.

5. The process as claimed in claim 1, wherein the total amount of monomers and protective colloid together with 5 to 20% by weight of the total amount of initiator are initially introduced into the reaction vessel, the polymerization is started at a temperature of 50° C. to 60° C. and the remaining amount of initiator is then metered in at a temperature of 80° to 90° C. such that a temperature of 80° C. to 90° C. is maintained until the end of the polymerization.

6. The process as claimed in claim 1, wherein the heat of reaction formed during the polymerization is removed by evaporative cooling by a procedure in which a water/monomer mixture is distilled off under reduced pressure, condensed and recycled to the reaction vessel.

7. A process for preparing a synthetic resin dispersion stabilized by a protective colloid and employing at least one initiator and based on a polymer of (a) a first monomer comprising at least one ester of acrylic acid or methacrylic acid and an alcohol containing 1 to 22 carbon atoms; and optionally (b) a second monomer which can be copolymerized with said first monomer said process comprising:

introducing at least 50% of the first monomer, and optionally, the second monomer based on the total weight of the monomers, at least 50% of the protective colloid based on the total weight of the protective colloid, and up to 50% of the initiator based on the total weight of the initiator into a reaction vessel to form an aqueous emulsion;

adding any remaining monomers and protective colloid, and at least 50% of the initiator based on the total weight of the initiator to the reaction vessel at a temperature of 30° to 100° C., wherein the first monomer is selected from the group consisting of methyl acrylate, ethyl acrylate, n-propyl acrylate, n-butyl acrylate, i-butyl acrylate, t-butyl acrylate, n-hexyl acrylate, n-octyl acrylate, 2-ethylhexyl acrylate, lauryl acrylate, stearyl acrylate, methyl methacrylate, ethyl methacrylate, n-propyl methacrylate, n-butyl methacrylate, i-butyl methacrylate, n-octyl methacrylate, 2-ethylhexyl methacrylate, decyl methacrylate, i-decyl methacrylate, lauryl methacrylate, stearyl methacrylate and behenyl methacrylate.

8. A process according to claim 1, wherein the second monomer comprises a vinyl aromatic, or a vinyl ester.

9. A process according to claim 8, wherein the second monomer comprises a vinyl ester of a linear or branched monocarboxylic acid having 2 to 12 carbon atoms, selected from vinyl acetate, vinyl propionate, vinyl butyrate, vinyl isobutyrate, vinyl pivalate, vinyl 2-ethylhexanoate, or a vinyl ester of an ($\alpha,\alpha$-dialkyl-branched monocarboxylic acid).

10. A process according to claim 1, wherein said polymer comprises a copolymer of (meth) acrylate and styrene, the content of styrene and (meth)acrylate monomers being greater than 50% by weight, based on the total monomer content.

11. A process according to claim 1, wherein said polymer comprises a copolymer selected from the group consisting of methyl methacrylate/butyl acrylate/methacrylic acid (25:74:1), methyl methacrylate/butyl acrylate/acetoacetoxyethyl methacrylate (34:64:2), methyl methacrylate/2-ethylhexyl acrylate/methacrylic acid (59:39:2), methyl methacrylate/butyl acrylate/lauryl methacrylate/methacrylic acid (35:58:5:2) and styrene/butyl acrylate/acrylic acid (34:64:2).

12. A process according to claim 1, wherein the protective colloid is selected from the group consisting of hydroxyethylcellulose, methylcellulose, carboxymethylcellulose, polyvinylpyrrolidone, polycarboxylic acids, polyvinyl alcohol, and a mixture thereof.

13. A process according to claim 1, wherein the protective colloid comprises polyvinyl alcohol, the degree of polymerization of the polyvinyl alcohol is between 200 to 3,500, and the degree of hydrolysis of the polyvinyl alcohol is between 80 to 98 mol %.

14. A process according to claim 1, wherein the initiator is selected from the group consisting of sodium peroxodisulfate, potassium peroxodisulfate, ammonium peroxodisulfate, 2,2'-azobis(2-amidino propane) dihydrochloride, tert-butyl hydroperoxide cumene hydroperoxide, dibenzoyl peroxide dilauryl peroxide, azobisisobutyronitrile, and mixtures thereof, the initiator being employed in an amount from 0.05 to 1.0% by weight, based on the total weight of the monomers.

15. A process according to claim 1, further comprising at least one emulsifier employed in an amount from 0.1 to 5% by weight, based on the total weight of the monomers.

16. The process according to claim 1, wherein the pH of the aqueous emulsion is between 4 and 7.

17. An aqueous synthetic resin dispersion stabilized by a protective colloid and prepared by the process as claimed in claim 1, having a glass transition temperature of at least −50° C. and a minimum film formation temperature of up to 60° C.

18. An aqueous synthetic resin dispersion according to claim 17 having a solids contents of 30 to 70% by weight, a 50% strength dispersion viscosity from 500 to 3,000 mPa.s, an average particle diameter $d_w$ from 500 to 2,500 nm, and a $d_w/d_n$ ratio between 3 and 20.

19. An aqueous synthetic resin dispersion according to claim 17, wherein the first monomer is selected from the group consisting of methyl acrylate, ethyl acrylate, n-propyl acrylate, n-butyl acrylate, i-butyl acrylate, t-butyl acrylate, n-hexyl acrylate, n-octyl acrylate, 2-ethylhexyl acrylate, lauryl acrylate, stearyl acrylate, methyl methacrylate, ethyl methacrylate, n-propyl methacrylate, n-butyl methacrylate, i-butyl methacrylate, n-octyl methacrylate, 2-ethylhexyl methacrylate, decyl methacrylate, i-decyl methacrylate, lauryl methacrylate, stearyl methacrylate and behenyl methacrylate.

20. An aqueous synthetic resin dispersion according to claim 17, wherein the second monomer comprises a vinyl aromatic, or a vinyl ester.

21. An aqueous synthetic resin dispersion according to claim 17, wherein the second monomer comprises a vinyl ester of a linear or branched monocarboxylic acid having 2 to 12 carbon atoms, selected from vinyl acetate, vinyl propionate, vinyl butyrate, vinyl isobutyrate, vinyl pivalate, vinyl 2-ethylhexanoate, or a vinyl ester of an ($\alpha,\alpha$-dialkyl-branched monocarboxylic acid).

22. An aqueous synthetic resin dispersion according to claim 17, wherein said polymer comprises a copolymer of (meth) acrylate and styrene, the content of styrene and (meth)acrylate monomers being greater than 50% by weight, based on the total monomer content.

23. A wood preservative comprising an aqueous synthetic resin dispersion stabilized by a protective colloid as a binder, said aqueous synthetic resin dispersion comprising a dispersion according to claim 17.

24. A redispersible synthetic resin powder comprising a powder produced from an aqueous synthetic resin dispersion stabilized by a protective colloid, said aqueous synthetic resin dispersion comprising a dispersion according to claim 17.

* * * * *